United States Patent [19]

Wheatley, III

[11] Patent Number: 5,577,265

[45] Date of Patent: *Nov. 19, 1996

[54] ANTENNA SYSTEM FOR MULTIPATH DIVERSITY IN AN INDOOR MICROCELLULAR COMMUNICATION SYSTEM

[75] Inventor: Charles E. Wheatley, III, Del Mar, Calif.

[73] Assignee: Qualcomm Incorporated, San Diego, Calif.

[*] Notice: The term of this patent shall not extend beyond the expiration date of Pat. No. 5,437,055.

[21] Appl. No.: 351,853

[22] Filed: Dec. 7, 1994

Related U.S. Application Data

[63] Continuation of Ser. No. 72,640, Jun. 3, 1993, Pat. No. 5,437,055.

[51] Int. Cl.$^6$ .................................................. H04B 7/04
[52] U.S. Cl. ...................... 455/33.3; 455/52.3; 455/65; 455/276.1; 455/279.1; 375/200
[58] Field of Search ........................... 455/33.3, 63, 65, 455/52.1, 52.2, 52.3, 272, 273, 276.1, 277.1, 278.1, 279.1, 283, 284; 342/374, 375; 375/200

[56] References Cited

U.S. PATENT DOCUMENTS

| | | | |
|---|---|---|---|
| 2,610,292 | 9/1952 | Bond et al. | 455/65 |
| 2,786,133 | 3/1957 | Dyke | 455/272 |
| 4,383,323 | 5/1983 | Timor | 375/1 |
| 4,470,138 | 9/1984 | Gutleber | 370/18 |
| 4,475,215 | 10/1984 | Gutleber | 375/34 |
| 4,672,658 | 6/1987 | Kavehrad et al. | 379/63 |
| 4,761,778 | 8/1988 | Hui | 370/46 |
| 4,841,527 | 6/1989 | Raychandhuri et al. | 371/32 |
| 4,901,307 | 2/1990 | Gilhousen et al. | 370/18 |
| 4,920,348 | 4/1990 | Baghdady | 342/433 |
| 4,984,247 | 1/1991 | Kaufmann et al. | 375/1 |
| 5,046,066 | 9/1991 | Messenger | 370/94.1 |
| 5,056,109 | 10/1991 | Gilhousen et al. | 375/1 |
| 5,073,900 | 12/1991 | Mallinckrodt | 375/1 |
| 5,101,501 | 3/1992 | Gilhousen et al. | 455/33.1 |
| 5,103,459 | 4/1992 | Gilhousen et al. | 375/1 |
| 5,109,390 | 4/1992 | Gilhousen et al. | 375/1 |
| 5,125,108 | 6/1992 | Talwar | 455/278.1 |
| 5,280,472 | 1/1994 | Gilhousen et al. | 455/279.1 |
| 5,283,780 | 2/1994 | Schuchman et al. | 455/65 |
| 5,437,055 | 7/1995 | Wheatley et al. | 455/65 |

OTHER PUBLICATIONS

"Characteristics of a Simulated Fast Fading Indoor Radio Channel," Vijitha Weerackody, 1993 IEEE, pp. 231–235.

"Measurement and Modeling of Propagation Losses in a Building at 900 MHz" Jean Francois LaFortune, IEEE Trans. Veh. Tech., vol. 39, No. 2, pp. 101–108, May 1990.

"A Statistical Model for Indoor Multi-Path Propagation" IEEE Jour. Sel. Areas. Comm., vol. SAC-5, No. 2, pp. 128–137, Feb. 1987.

"Combined Effects of Phase Sweeping Transmitter Diversity and Channel Coding", Hiroike et al., IEEE Transactions, vol. 41, No. 2, May 1992, pp. 170–176.

(List continued on next page.)

*Primary Examiner*—Edward F. Urban
*Assistant Examiner*—Thanh Le
*Attorney, Agent, or Firm*—Russell B. Miller; Katherine W. White

[57] ABSTRACT

A system for mitigating the effect of fading in a digital communication system. Deep signal nulls occur when signals from multiple paths are precisely aligned in amplitude and phase canceling the signal at the receiving antenna and creating a fade. In an indoor system, moving either transmitter or receiver a short distance can shift a fade away from the frequency of interest. This invention provides an actual or perceived movement of an antenna such that the effects of fading can be averaged over a time interval. The signal processing capability of modern digital transceivers can correct errors due to the time varying fades using the present invention. Thus, a dual-antenna element using the system of this invention can provide diversity receive and transmit paths to maintain capacity. The present invention may also provide improved capacity to due enhanced stability in power control.

13 Claims, 3 Drawing Sheets

OTHER PUBLICATIONS

"Design and Experimental Results for a Direct Sequence Spread Spectrum Radio Using DPSK Modulation for Indoor, Wireless communications" Kavehrad et al, IEEE Jour. Sel. Areas Communication vol. SAC–5, No. 5 pp. 815–823, Jun. 1987.

"The Effects of Multipath and Fading on the Performance of Direct Sequence CDMA System" G. L. Turin, IEEE Jour. Sel. Areas. Comm., vol. SAC–2, No. 4, pp. 597–603, Jul. 1984.

"Multipath Diversity Reception of Spread–Spectrum Multiple Access Communications." J. S. Lehnert, IEEE Trans Comm., vol. COM–35, No. 11, pp. 1189–1198, Nov. 1987.

"Effects of Fluorescent Lights on Signal Fading Characteristics for Indoor Radio Channels" Electron Lett., vol. 28, No. 18, pp. 1740–1741, Aug. 27, 1992.

ANTENNA SYSTEM FOR MULTIPATH DIVERSITY IN AN INDOOR MICROCELLULAR COMMUNICATION SYSTEM

This is a continuation of application Ser. No. 08/072,640 filed Jun. 3, 1993 now U.S. Pat. No. 5,437,055 issued Jul. 25, 1995.

BACKGROUND OF THE INVENTION

1. Field of the Invention

This invention relates generally to a system for enhancing signal coverage inside building structures and, more particularly, to an antenna system for controlling the duration of local signal nulls in a microcellular communication system to permit signal data recovery through conventional error-correction techniques.

2. Discussion of the Related Art

The use of radio frequency signals for indoor data or voice communications is increasingly desirable because of improvements in channel capacity and related apparatus cost reductions. Within an office building, a warehouse, a factory, a hospital, a convention center or an apartment building, radio communication avoids tying the user to particular locations within these buildings, thus offering true mobility, which is convenient and perhaps necessary. Availability of radio links indoors also drastically reduces wiring requirements for new construction and offers flexibility for changing or creating various communication services within existing buildings without the conventional expense of rewiring the structure. The problems associated with indoor radio communication systems include how to offer the sophisticated local radio communication system necessary to provide such services to the majority of people within a building simultaneously. Such systems involve radio signals that are strongly affected by the multipath delay spread and the spatial and temporal statistics of signal attenuation particular to indoor propagation environment.

The indoor signal propagation environment has been examined by several practitioners in recent times. For instance, Jean François LaFortune et al. ("Measurement and Modeling of Propagation Losses in a Building at 900 MHz", IEEE Trans. Veh. Technol., Vol. 39, No. 2, pp. 101–108, May 1990) offer an empirical attenuation model giving estimates of transmission, reflection and diffraction phenomena occurring in the transmission path based on measurements in two large buildings of similar design. Also, Adel A. M. Saleh, et al. (A Statistical Model For Indoor Multi-Path Propagation), IEEE Jour. Sel. Areas Commun., Vol. SAC-5, No. 2, pp. 128–137, February 1987) report that indoor multipath propagation measurements support a simple statistical multipath model of the indoor radio channel. With this model, the received signal rays arrive in clusters. The rays have independent uniform phases and independent Rayleigh amplitudes with variances that decay exponentially with cluster and ray delays. These dusters and the rays within each cluster form Poisson arrival processes with different but fixed rates. The clusters are formed by the building superstructure, while the individual rays are formed by objects in the vicinities of the transceivers.

A fundamental problem with the indoor radio channel arises from the signal fading characteristics resulting from the multipath propagation statistics. Practitioners have introduced digital communication systems designed to correct dropout errors resulting from transient signal fading. For instance, direct-sequence spread-spectrum microcellular systems have been proposed for indoor radio communications (M. Kavehrad, et al., "Design and Experimental Results For A Direct Sequence Spread Spectrum Radio Using DPSK Modulation For Indoor, Wireless Communications" IEEE Jour. Sel. Areas Commun., Vol. SAC-5, No. 5, pp. 815–823, June 1987). Code Division Multiple Access (CDMA) techniques are also proposed to provide several simultaneous bi-directional links to a plurality of mobile stations from a single base station within a building (G. L. Turin, "The Effects of Multipath and Fading On The Performance of Direct-Sequence CDMA Systems," IEEE Jour. Sel. Areas Commun., Vol. SAC-2, No. 4, pp. 597–603, July 1984). One solution to combat indoor multipath fading in CDMA systems is to increase the spreading bandwidth in combination with a the RAKE receiver, which reduces multipath fading effects (J. S. Lehnert, "Multipath Diversity Reception of Spread-Spectrum Multiple-Access Communications," IEEE Trans. Commun., Vol. COM-35, No. 11, pp. 1189–1198, November 1987).

A RAKE-type receiver architecture provides multiple receivers each capable of receiving a signal that has traveled a different path and therefore exhibits a different delay. An example of such a RAKE receiver is disclosed in U.S. Pat. No. 5,109,390 entitled "Diversity Receiver In A CDMA Cellular Telephone System" assigned to the assignee of the present invention, the disclosure of which is incorporated by this reference. Included in the described receiver is a separate searcher receiver which continuously scans the time domain looking for the best paths and assigning the multiple receivers accordingly. The receivers can track distinct arriving signals provided that the time difference between arriving signals exceeds one PN chip duration, i.e. 1/bandwidth of the spread spectrum signal. In an outdoor cellular system, delays greater than one PN chip are likely due to the relatively large distance between reflective objects. However in an indoor system., multipath signals are likely to be reflected from closely located object and therefore have short time delays with respect to each other.

The signal fading characteristics of indoor radio channels result from multipath propagation due to reflections from closely located surfaces. It is known in the art that motion of people causes transient fading at rates less than 5 Hz in signal carrier frequencies of around 900 MHz. On a lesser scale, it is also known in the art that observations of continuous fading at 120 Hz are related to the effects of the electric power network manifested in fluorescent light plasma columns (P. Melançon et al. "Effects of Fluorescent Lights on Signal Fading Characteristics For Indoor Radio Channels", Electron. Lett., Vol. 28, No. 18, pp. 1740–1741, Aug. 27, 1992). The fading caused by fluorescent lighting varies continuously at a significantly higher rate than fading caused by the normal movements of people. The average signal-to-noise ratio (SNR) is reduced and the fading signal is manifested at a rectified sine wave that is always present at any location where there are fluorescent lights.

One solution to the multipath fading problem was proposed by Gilhousen et al. in U.S. patent application Ser. No. 07/624,118 filed on Dec. 7, 1990, entitled "CDMA Microcellular Telephone System and Distributed Antenna System Therefor", assigned to the assignee hereof and entirely incorporated herein by this reference. This method uses an array of cell-site transceiver antennas located at different sites or "sectors" within the cell area. The single base station signal is both transmitted and received from all of the antennas in the array. The signal at each antenna is substantially delayed in time with respect to the signals at the other antennas so that each antenna's signal can be discriminated through its temporal diversity by a receiver. This solution works well for multipath fading because the signal is unlikely to fade at all cell antennas simultaneously. Thus, the multiple-site signals can be combined through temporal diversity to create a nonfading aggregate signal. Although the just mentioned distributed antenna system provides significant improvement in the indoor cellular environment, other factors exit which can cause a degradation in system performance.

In an indoor CDMA cellular system, a cell-site or base station transceiver establishes independent communication with a plurality of mobile transceivers. The transmit and receive frequencies for the base station transceiver are different. Although different, the two frequencies are within the same band and the path loss of the base station transceiver to mobile transceiver link or forward link is an excellent predictor of the path loss of the mobile transceiver to base station transceiver link or the reverse link. Therefore, typically, the mobile transceiver measures the signal level received from the base station transceiver and bases the level of its transmitter signal thereon. This operation is referred to as open loop power control for which further details can be found in U.S. Pat. No. 5,056,106 entitled "Method and Apparatus for Controlling Transmission Power in a CDMA Cellular Mobile Telephone System" issued Oct. 8, 1991, the disclosure of which is incorporated by this reference. In the CDMA system, power control is critical to achieve theoretical maximum capacity in the system. The transmit power level of all mobile transceivers must be closely controlled such that the transmitted signals arrive at the base station transceiver at the same level. Typically the mobile stations transmit at a minimum power level sufficient to maintain a quality communication link. To supplement open loop power control, a closed loop power control is disclosed in above mentioned U.S. Pat. No. 5,056,106. In closed loop power control, the base station sends transmission power adjustment commands to the of a mobile station on the forward link thereby controlling the mobile stations transmitted power on the reverse link.

In an indoor cellular environment, random and severe multipath fading occurs. Open loop power control is directed to compensate for such fading condition. In the outdoor environment, there is a good correlation between fading on the transmit and receive frequency band. However in the indoor cellular environment fading can be quite different for the transmit frequency than for the receive frequency. Uncorrelated fading of these two signals can cause improper power control adjustments in the open loop power control. These improper adjustments can result in unwanted fluctuations in the signal level received at the base station transceiver from the mobile transceiver thereby affecting the capacity of the system. For instance, the difference in the forward link and the reverse link fading may cause the mobile station to exceed the possible range of closed loop power control. Therefore it is desirable to have an antenna system which reduces fading problems and the deleterious effects of fading on power control.

SUMMARY OF THE INVENTION

The basic idea of this invention is to exploit the capability of direct sequence spread spectrum transceivers to operate in a dynamically changing multipath environment by using time diversity as well as path diversity. Time diversity is available in CDMA transceivers primarily through interleaved encoding. Typically fading causes a cluster of errors in time. Such error clusters are more effectively corrected if they are converted to independent errors for which optimal correction coding methods can be developed. Through interleaving, burst errors are transformed into independent errors. Thus, data lost during a brief fade can be reconstructed using error correction techniques after deinterleaving to spread a burst of missing data of the signal over time as a series of small gaps of missing data. Thus, it is an objective of this invention to provide a method for minimizing the duration of deep signal fades at a transceiver antenna by converting a static fade condition to a dynamic fade condition.

This objective is met by vacillation of the phase of the signal transmission path to disrupt the alignment of amplitude and phase of the multipath signal which can create a deep fade in a channel. Such vacillation causes static fades to become time-varying fades which permit channel errors to be corrected by existing deinterleaving and convolutional decoding procedures for error correction.

It is another objective of this invention to equalize the average transmit and receive signal power loss in the channel, thereby enhancing open loop power control. The vacillation of the phase of the signal has a time averaging effect on fades. The averaging process correlates the path loss of the base station transceiver to mobile transceiver link to the path loss of the mobile transceiver to base station transceiver link thereby improving the performance of open loop power control.

The system of this invention changes the apparent location of the transceiver antenna element without necessarily physically moving it. Because a null occurs only upon precise alignment of amplitude and phase cancellation among all paths, such a null is very dependent on the precise radiation pattern of the antenna.

The system of this invention is based on the unexpected observation that, by altering the symmetry of the antenna pattern by only a few dB, the fade nulls move both in space and in frequency.

It is an advantage of this invention that the speed and manner of varying the directivity pattern of the antenna element of this invention can be controlled to restrict the duration of multipath nulls at any particular location to a predetermined threshold value. Such a threshold value can be selected to conform with the error correction capacity of the particular CDMA channel parameters contemplated.

The system of this invention results in a dynamic single path Rayleigh fading for both forward and reverse paths from a dual-antenna element. Adding neighboring elements to form a distributed antenna can generate additional time-spaced multipath signals that may be sufficient to mitigate all indoor propagation fading effects. It is an advantage of the element of this invention that even if other distributed elements are not in view, a single isolated dual-antenna element of this invention can provide all necessary diversity over both transmit and receive paths. It is another advantage of the dual-antenna element of this invention that the time-varying directivity pattern substantially improves open loop power control effectiveness.

The foregoing, together with other objects, features and advantages of this invention, will become more apparent when referring to the following specification, claims and the accompanying drawings.

BRIEF DESCRIPTION OF THE DRAWINGS

For a more complete understanding of this invention, reference is now made to the following detailed description of the embodiments as illustrated in the accompanying drawings, wherein:

FIG. 1, comprising

DESCRIPTION OF THE PREFERRED EMBODIMENTS

The general requirements for operation of a microcellular communication system as exemplified by a spread spectrum wireless communication system can be appreciated with reference to the above-cited Gilhousen et al. patent application. In such a microcellular arrangement, a distributed antenna system is employed to provide multipath signals giving signal diversity necessary for enhanced system performance. The system of this invention improves on the distributed antenna system disclosed by Gilhousen et al. by employing a spatial dithering technique at each antenna to control the fade null dwell times at the transceivers.

Figure 1A:
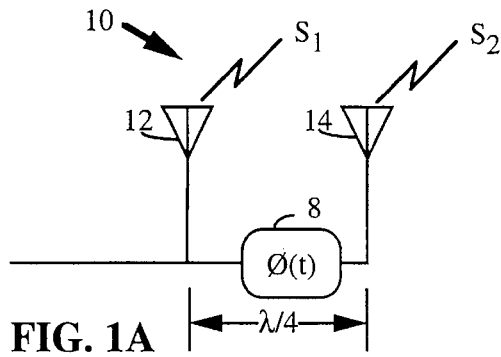
FIGS. 1A and 1B, illustrates the dual-antenna element of the present invention.

FIG. 1A shows a schematic diagram of the essential features of the dual-antenna element of this invention. The dual-antenna element 10 includes at least two spaced apart radiating and receiving antennas 12 and 14. Dual-antenna element 10 must include at least two antennas and may incorporate any useful larger number thereof. Antennas 12 and 14 can be omnidirectional, directional, or dipole antennas or any type of antenna having similar receive and transmit patterns. Antennas 12 and 14 are shown separated by distance $\lambda/4$, which is equal to one-fourth of a wavelength at the carrier frequency. Thus, for a carrier frequency of 850 MHz and a propagation velocity of 300 Mm/s, one-fourth wavelength is about 88 mm (3.5 inches). This example computation demonstrates the fundamental distinction between the dual-antenna element of this invention and the previously disclosed distributed antenna having several widely separated elements. The $\lambda/4$ spacing is only an example. Other spacings may offer improved pattern distribution depending on the particular indoor propagation environment. Each node of the distributed antenna may include one or more of the dual-antenna elements of this invention.

In operation, dual-antenna element 10 of this invention radiates a digitally modulated signal preferably a direct sequence pseudo random code modulated data signal associated with a carrier frequency and a phase. For instance, in FIG. 1A, signal $S_1$ is radiated from antenna 12 and signal $S_2$ is radiated from antenna 14. The time period of the phase variation should be shorter than the CDMA interleaver frame window time to obtain the benefit of time diversity provided by the interleaver. Such control can be accomplished in any useful means known in the art, such as by means of a DC level signal applied to a voltage-variable-capacitor or by means of a digital control signal applied to a digital register disposed as a delay line. The control can be periodic or random.

Figure 1B:
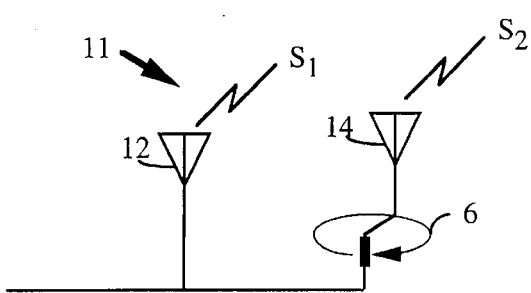

The introduction of a time-varying phase shift into the signal path may be accomplished by actual physical movement of the antenna. For example, FIG. 1B shows alternative dual-antenna element 11 having antenna 14 mounted on rotating assembly 6 such that antenna 14 passes through a range of locations which effectively shifts the phase of the signal $S_2$ through a corresponding range.

Figure 2:
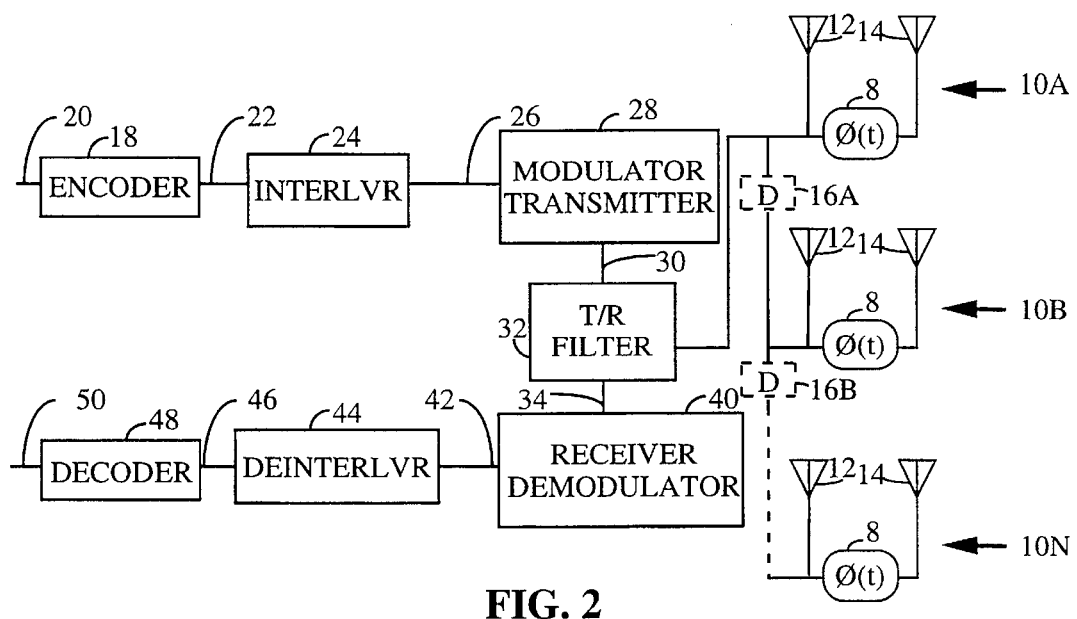
FIG. 2 shows a block diagram of the base station transceiver circuitry coupled to the dual-antenna elements of the present invention.

FIG. 2 provides a functional block diagram of the typical CDMA base station transceiver employing a set of distributed dual-antenna elements 10A–10N according to this invention. The CDMA signal to be transmitted is presented to an encoder 18 on a line 20. The encoded signal 22 is interleaved by interleaver 24 to provide an interleaved signal 26, which is then direct sequence spread and modulated upon a carrier frequency for transmission in modulator transmitter 28. The modulated carrier frequency 30 is applied through a transmit/receive filter 32 to dual-antenna elements 10A–10N. Because the transmitted CDMA signal carrier frequency differs from the received CDMA signal carrier frequency, transmit/receive filter 32, which is a duplexer, operates to extract the received CDMA signal carrier 34 from dual-antenna element 10A–10N. Modulated carrier frequency 30 is presented directly to antenna 12 and is modulated by time variable phase shifter Ø(t) 8 before presentation to the second antenna 14 in each dual-antenna element 10 of the series.

The variation of the phase shift in phase shifter Ø(t) 8 affects the receive antenna pattern in a similar manner that it affects the transmit antenna pattern. At the receive carrier frequency, the received CDMA signals are extracted in filter 32 as mentioned above. The combined received CDMA signal 34 is first despread, then demodulated in receiver demodulator 40 to extract the received signal at line 42. Signal 42 is deinterleaved in deinterleaver 44 to obtain the deinterleaved data signal 46, which is then decoded in decoder 48 to obtain the received data output signal 50.

Figure 3:
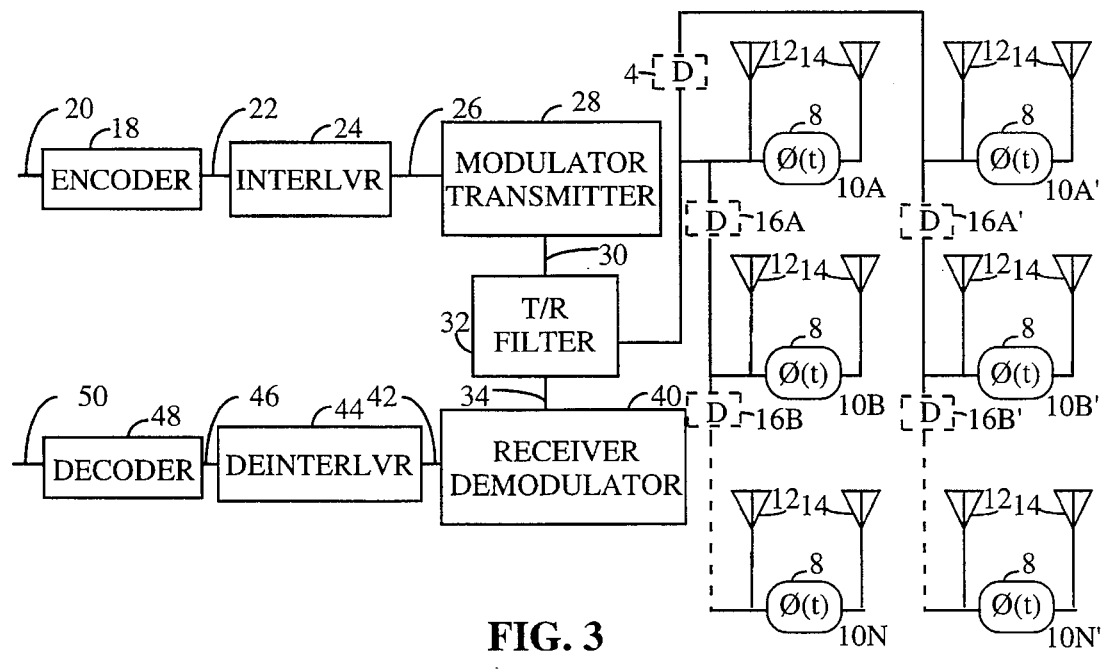
FIG. 3 shows a block diagram of an alternative configuration of an array of dual antenna elements.

Antenna elements 10A–10N of FIG. 2 may be separated by delay elements 16A–16(N-1) to provide time diversity between nodes. Although the arrangement of FIG. 2 reduces the effect of a null due to a disadvantageous position of the mobile, a further reduction may be achieved by providing a second set of antennas elements. FIG. 3 illustrates a second set of antenna elements 10A'–10N' separated by delay elements 16A'–16(N-1)' which may also be deployed and placed in parallel with the first set of antennas. Each antenna element of the second set of antennas would be collocated with an antenna element of the first set forming an antenna node. For complete time diversity, leading delay element 4 could be added to the second set of antennas providing time diversity at each node. The antenna elements may also comprise gain, filtering, and frequency conversion circuitry. Further information can be found in copending U.S. patent application Ser. No. 08/112,392, filed Aug. 27, 1993 and entitled "DUAL DISTRIBUTED ANTENNA SYSTEM" which is a continuation-in-part application of U.S. Pat. No. 5,280,472, issued Jan. 18, 1994, and entitled "CDMA MICROCELLULAR TELEPHONE SYSTEM AND DISTRIBUTED ANTENNA SYSTEM THEREFOR" both of which are assigned to the assignee of the present invention.

Figure 4:
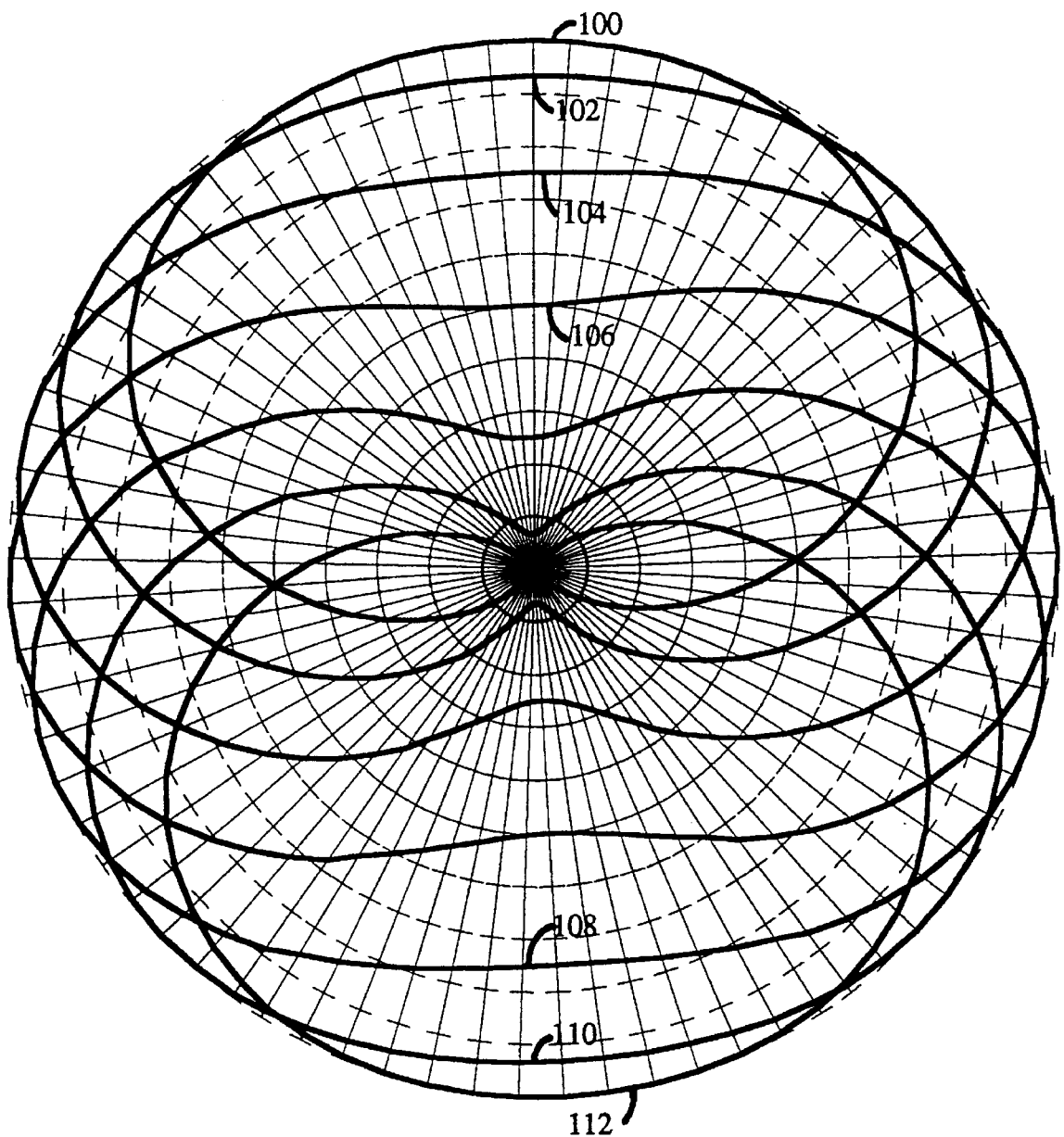
FIG. 4 is a the polar plot of antenna directivity patterns for the antenna of FIG. 1.

The configuration of FIG. 1A operates to vacillate the effective spatial locus of dual-antenna element 10 over time by introducing a time- varying phase shift value into phase shifter Ø(t) 8. In accordance with the principle of reciprocity, the transmission pattern characteristics of dual-antenna element 10 are closely similar to the receive pattern characteristics of the same antenna. FIG. 4 shows examples of the changing pattern of a dual-antenna element 10 relative to changes in the phase shift value presented by phase shifter Ø(t) 8 in FIG. 1A. The patterns range from +90° phase difference through zero to −90° phase difference for the λ/4 separation shown in FIG. 1A. Curve 100 illustrates the asymmetrical scan pattern of the dual-antenna element with a +90° phase difference. Curves 102 and 104 illustrate the scan pattern of the dual-antenna element with a +60° and +30° phase difference, respectively. Symmetrical curve 106 illustrates the scan pattern of the dual-antenna element with no phase shift. Curves 108, 110, and 112 illustrate the scan pattern of the dual-antenna element with a −30°, −60°, and −90° phase difference, respectively.

To demonstrate the effect on signal fade nulls of the changing directivity pattern shown in FIG. 4, data is presented over the carrier frequency region between the 800 and 900 MHz at four random phase shifter delay values. The results of these measurements are provided in FIG. 5 for a λ/4 spacing. Note that varying the antenna pattern was found to shift the fade null signal levels by more than 10 dB at a single frequency. In some cases, the fade null frequency value is moved by several MHz, which exceeds a typical 1.25 MHz CDMA microcellular communication system operating band. Thus, for the example shown in FIG. 5, the dual-antenna element of this invention can shift a typical fade away from the frequency of interest.

Figure 5:
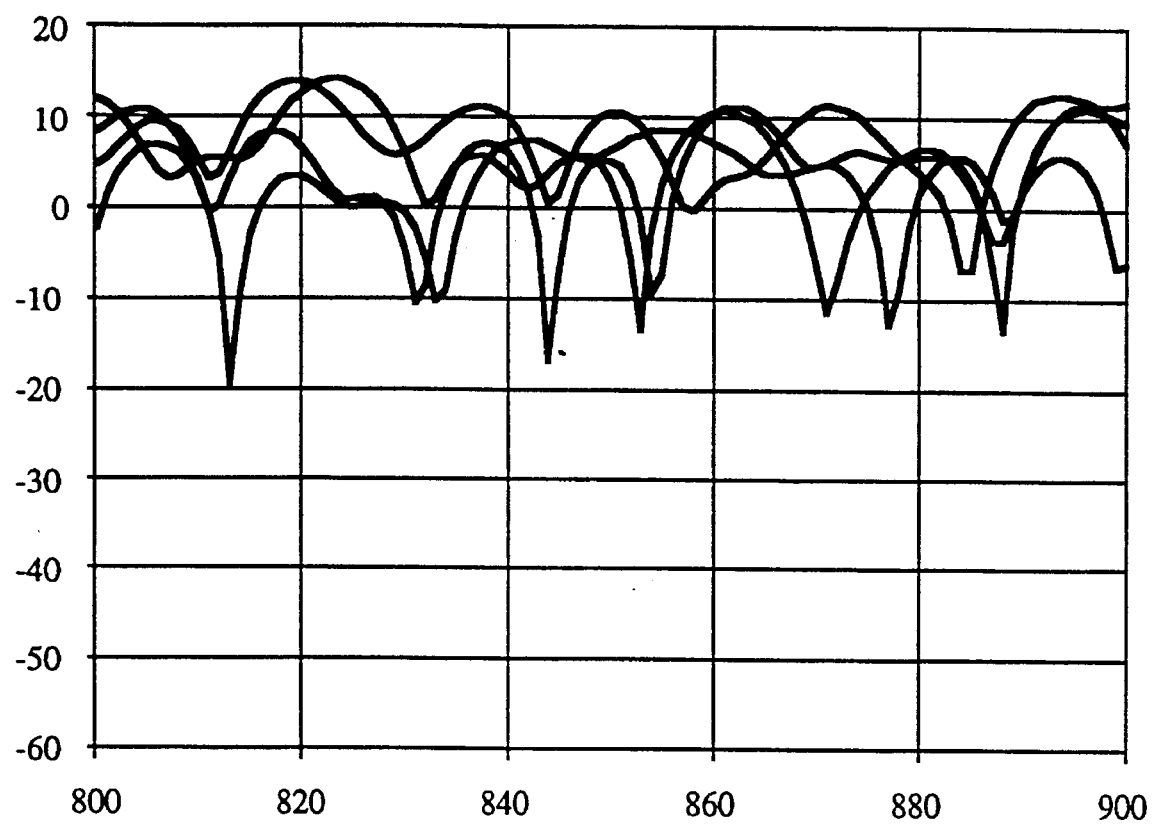
FIG. 5 illustrates the typical variation in signal strength over frequency and time for the antenna of FIG. 1 in an indoor environment.

FIG. 5 also illustrates the averaging effect of the present invention on the power level received and transmitted by the mobile transceiver. By examining a single trace of FIG. 5, it is evident that frequencies separated several MHz have very different fading losses given a single phase difference and thus cause inaccurate open loop power control as described above. However it is also evident that if the four traces were averaged, the variation would be much smaller. If the time period of the phase variation is short with respect to the time constant of the open loop power control circuit then the present invention effectively performs the averaging mechanism thereby causing open loop power control to operate more precisely.

A profusion of alternative embodiments are available for the implementation of an actual system both for the single dual-antenna element and distributed dual-antenna element configurations. A dual-antenna element may comprise additional circuitry such as a delay element, an amplification element, frequency conversion circuitry, or a filter. The signals carried to the elements may be transmitted to the antenna via an additional set of corresponding antennas in place of the cabling as shown above. The present invention may be used in an outdoor environment for instance, in downtown areas having tall building crowded closely together.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

I claim:

1. In a code division multiple access (CDMA) communication system in which system users communicate information signals with other system users through a base station using CDMA communication signals spread upon a carrier signal, said base station having an antenna system comprising:

a set of antenna elements each having two antennas spaced apart by less than a wavelength of said carrier signal;

a time variant phase shifting means, disposed between each of said two antennas of each of said antenna elements, for varying phase at a selected rate between said two antennas of each of said antenna elements; and signal distribution means for coupling CDMA communication signals between said base station and said set of antenna elements.

2. The system of claim 1 wherein said signal distribution means comprises transmission cabling serially interconnecting each of said antenna elements of said set of antenna elements and interconnecting a first one of said antenna elements to said base station, said signal distribution means including at least one time-diversity delay element coupled between two of said antenna elements.

3. The system of claim 1 wherein said CDMA communication signals are time interleaved by an interleaver algorithm having a predetermined interleaver frame window time.

4. The system of claim 3 wherein said time variant phase shifting means varies the phase difference of said two antennas over a range of phases periodically with a cycle time which is on the order of said predetermined interleaver frame window time.

5. The system of claim 1 wherein said antenna elements each have a predetermined antenna element pattern with said antennas positioned with overlapping patterns.

6. The system of claim 5 wherein said antenna elements are positioned with substantially overlapping patterns.

7. The system of claim 1 wherein said time variant phase shifting means comprises means to move the location of a first one of said two antennas through range of locations sufficient to cause a phase variance between said two antennas.

8. The system of claim 7 wherein:

each of said two antennas has a predetermined antenna pattern which combined create an antenna element radiation pattern; and said time variant phase shifting means causes said radiation pattern to change over time.

9. The system of claim 1 wherein:

each of said two antennas has a predetermined antenna pattern which combined create an antenna element radiation pattern; and said time variant phase shifting means causes said radiation pattern to change over time.

10. The system of claim 1 wherein said time variant phase shorting means randomly varies the phase difference of said two antennas.

11. In a microcellular digital communication system having one or more mobile transceivers and at least one stationary transceiver with at least one antenna element comprising a set of antennas for sending and receiving data signals using carrier signals of first and second predetermined wavelengths, respectively, said carrier signals being propagated between any of said mobile transceivers and said stationary transceiver through a channel having a plurality of paths, each of said antennas within said set of antennas being separated by a distance less than the greater of said first and second predetermined wavelengths from at least one other of said antennas, a method for limiting the maximum signal fading loss duration in said propagation channel to a predetermined threshold value, said method comprising the steps of:

coupling together said set of antennas creating a radiation pattern thereof;

modulating said radiation pattern of said set of antennas by varying phase between at least two of said antennas at a predetermined rate, said predetermined rate being selected such that said signal fading loss duration of said data signal sent and received over any of said plurality of paths in said system is reduced below said predetermined threshold value;

wherein variation in fading loss at said first and second wavelengths is reduced as a consequence of modulation of said radiation pattern.

12. In a microcellular digital communication system having one or more mobile transceivers and at least one stationary transceiver with at least one antenna element, said at least one antenna element comprising first and second antennas for receiving a data signal having a carrier signal of predetermined wavelength propagated between any of said mobile transceivers and said stationary transceiver through a propagation channel, said first and second antennas being separated by a distance less than said predetermined wavelength, a method for receiving said data signal such that the maximum signal fading loss duration in said propagation channel is limited to a predetermined threshold value, said method comprising the steps of:

coupling together said first and second antennas creating a radiation pattern thereof, said set of antennas producing at least first and second received signals;

varying said radiation pattern of said set of antennas by varying phase between at least two of said antennas at a selected rate in order that signal fading loss duration of the sum of said first and second received signals is reduced below said predetermined threshold value; and demodulating said sum of said first and second received signals.

13. In a microcellular digital communication system having one or more mobile transceivers and at least one stationary transceiver with at least one antenna element comprising a set of antennas for sending and receiving data signals using carrier signals of first and second predetermined wavelengths, respectively, said carrier signals being propagated between any of said mobile transceivers and said stationary transceiver through a channel having a plurality of paths, each of said antennas within said set of antennas being separated by a distance less than the greater of said first and second predetermined wavelengths from at least one other of said antennas, a method for limiting the maximum signal fading loss duration in said propagation channel to a predetermined threshold value, said method comprising the steps of:

coupling together said set of antennas creating a radiation pattern thereof, at least two of said antenna elements being coupled together such that time-diversity exists between signals respectively communicated through said at least two antenna elements;

modulating said radiation pattern of said set of antennas at a predetermined rate sufficient to reduce, below said predetermined threshold value, said signal fading loss duration of said data signal sent and received over any of said plurality of paths in said system;

wherein variation in fading loss at said first and second wavelengths is reduced as a consequence of modulation of said radiation pattern.

\* \* \* \* \*